(12) United States Patent
Hashimoto

(10) Patent No.: US 12,087,960 B2
(45) Date of Patent: Sep. 10, 2024

(54) BATTERY PACK

(71) Applicant: SANYO Electric Co., Ltd., Osaka (JP)

(72) Inventor: Takeshi Hashimoto, Nara (JP)

(73) Assignee: PANASONIC ENERGY CO., LTD., Osaka (JP)

( * ) Notice: Subject to any disclaimer, the term of this patent is extended or adjusted under 35 U.S.C. 154(b) by 804 days.

(21) Appl. No.: 17/256,181

(22) PCT Filed: Jun. 10, 2019

(86) PCT No.: PCT/JP2019/022845
§ 371 (c)(1),
(2) Date: Dec. 25, 2020

(87) PCT Pub. No.: WO2020/012848
PCT Pub. Date: Jan. 16, 2020

(65) Prior Publication Data
US 2021/0273284 A1    Sep. 2, 2021

(30) Foreign Application Priority Data

Jul. 11, 2018   (JP) ................................. 2018-131603

(51) Int. Cl.
*H01M 50/247*   (2021.01)
*H01M 10/0525*   (2010.01)
(Continued)

(52) U.S. Cl.
CPC ....... *H01M 50/247* (2021.01); *H01M 50/213* (2021.01); *H01M 50/284* (2021.01); *H01M 10/0525* (2013.01); *H01M 2220/30* (2013.01)

(58) Field of Classification Search
CPC ............. H01M 50/213; H01M 50/271; H01M 50/233; H01M 50/291; H01M 10/643
See application file for complete search history.

(56) References Cited

U.S. PATENT DOCUMENTS

| 8,216,714 B2 | 7/2012 | Naito |
| 2010/0248004 A1 | 9/2010 | Takeshita et al. |
| 2012/0121969 A1 | 5/2012 | Takemura et al. |

FOREIGN PATENT DOCUMENTS

| EP | 2 442 381 A1 | 4/2012 |
| JP | 5-290821 | 11/1993 |

(Continued)

OTHER PUBLICATIONS

Extended (Supplementary) European Search Report dated Jul. 30, 2021, issued in counterpart EP application No. 19833694.3. (8 pages).

(Continued)

*Primary Examiner* — Sadie White
*Assistant Examiner* — Kayla Elaine Clary
(74) *Attorney, Agent, or Firm* — WHDA, LLP

(57) ABSTRACT

The battery pack includes cylindrical battery, a circuit board, and an exterior case including first case and second case. First case has a curved portion along an outer peripheral surface of cylindrical battery and first vertical wall connected to an end edge of the curved portion. Second case has second vertical wall connected to first vertical wall. First vertical wall has fitting protrusion protruding from opposed surface facing second vertical wall. Second vertical wall has fitting groove that is formed in opposed surface facing first vertical wall and that guides fitting protrusion. Fitting protrusion is guided into fitting groove, and first vertical wall and second vertical wall are welded together. First vertical wall has inner surface in a concave shape along a surface of cylindrical battery, and a leading end portion with opposed surface, being thicker than curved portion.

8 Claims, 9 Drawing Sheets

(51) Int. Cl.
*H01M 50/213* (2021.01)
*H01M 50/284* (2021.01)

(56) References Cited

FOREIGN PATENT DOCUMENTS

| | | |
|---|---|---|
| JP | 2010-238649 | 10/2010 |
| JP | 2011-034763 | 2/2011 |
| JP | 2014053170 A * | 3/2014 |
| JP | 2016-119248 | 6/2016 |

OTHER PUBLICATIONS

International Search Report of PCT application No. PCT/JP2019/022845 dated Aug. 27, 2019.

* cited by examiner

BATTERY PACK

CROSS-REFERENCE TO RELATED APPLICATIONS

This application is a U.S. national stage application of the PCT International Application No. PCT/JP2019/022845 filed on Jun. 10, 2019, which claims the benefit of foreign priority of Japanese patent application No. 2018-131603, filed on Jul. 11, 2018, the contents all of which are incorporated herein by reference.

TECHNICAL FIELD

The present invention relates to a battery pack containing a cylindrical battery.

BACKGROUND ART

Battery packs that use cylindrical batteries are used as power sources for digital cameras, camcorders, vacuum cleaners, power tools, and so on. Such a battery pack has an exterior case housing a cylindrical battery. For example, a secondary battery pack illustrated in FIG. 9 includes first case 92A and second case 92B that are made of plastic and divided into upper and lower parts, and that are ultrasonically welded to form exterior case 92 in which cylindrical battery 91 is housed (refer to PTL 1).

Battery packs each including divided first and second cases that are connected to contain a cylindrical battery inside and having a thin exterior case cannot fabricate a strong connecting structure. Battery packs having insufficient strength are likely to be damaged by impacts such as dropping, and are each required to increase a thickness of an exterior case to achieve sufficient strength. Although battery packs are required to have contradictory characteristics of being compact and lightweight while increasing their capacity, increase in capacity can be achieved by enlarging a cylindrical battery. Thus, the battery packs are required to have exterior cases reduced in thickness for miniaturization. This requires the battery packs to have essential characteristics of achieving sufficient strength while thinning the exterior cases to achieve the miniaturization and the increase in capacity.

CITATION LIST

Patent Literature

PTL 1: Unexamined Japanese Patent Publication No. 5-290821
PTL 2: Unexamined Japanese Patent Publication No. 2016-119248

SUMMARY OF THE INVENTION

The present invention is made in view of such a background, and it is an object thereof to provide a battery pack that achieves sufficient strength while avoiding increase in size of the battery pack containing a cylindrical battery.

A battery pack of the present invention includes cylindrical battery 1, circuit board 3 that is electrically connected to cylindrical battery 1 and is mounted with a charge and discharge circuit, and exterior case 2 that is composed of first case 10 and second case 20 to house cylindrical battery 1 and circuit board 3. First case 10 has curved portion 12 that curves along an outer peripheral surface of cylindrical battery 1 and first vertical wall 11 that is integrally connected to an end edge of curved portion 12. Second case 20 has second vertical wall 21 connected to first vertical wall 11. First vertical wall 11 has fitting protrusion 15 protruding from opposed surface 11a facing second vertical wall 21. Second vertical wall 21 has fitting groove 25 that is formed in opposed surface 21a facing first vertical wall 11 and that guides fitting protrusion 15. Fitting protrusion 15 is guided into fitting groove 25, and first vertical wall 11 and second vertical wall 21 are welded together. First vertical wall 11 has inner surface 11c in a concave shape along a surface of cylindrical battery 1, and a leading end portion with opposed surface 11a, being thicker than curved portion 12.

Although the present invention does not limit the battery pack to the following, the following structure is available.

The battery pack of the present invention can be configured such that boundary position h between inner surface 11c of first vertical wall 11 and fitting protrusion 15 is disposed inside tangential line n of cylindrical battery 1 at boundary position k between first vertical wall 11 and curved portion 12.

The battery pack of the present invention can be configured such that a distance between tangential line n of cylindrical battery 1 at boundary position k between first vertical wall 11 and curved portion 12, and boundary position h between inner surface 11c of first vertical wall 11 and fitting protrusion 15, is more than or equal to 0.1 mm and less than or equal to 1 mm.

The battery pack of the present invention can be configured such that first case 10 is provided on both sides with a pair of first vertical walls 11, boundary surface P including boundary positions k between the pair of first vertical walls 11 and curved portion 12 is located in central plane M extending radially and passing through center axis m of cylindrical battery 1, and first vertical walls 11 are each disposed at a position protruding from central plane M.

The battery pack of the present invention can be configured such that leading end surface S including opposed surface 11a of each of the pair of first vertical walls 11 disposed on both sides of first case 10 is disposed outward away from central plane M including center axis m of cylindrical battery 1.

The battery pack of the present invention can be configured such that circuit board 3 is disposed at a position facing an end face of cylindrical battery 1.

The battery pack of the present invention can be configured such that the inner surface of first vertical wall 11 is wholly disposed inside tangential line n of cylindrical battery 1 at boundary position k between first vertical wall 11 and curved portion 12 in a region where exterior case 2 has circuit board 3 disposed inside.

The battery pack of the present invention can be configured such that the inner surface of first vertical wall 11 is in a planar shape in the region where exterior case 2 has circuit board 3 disposed inside.

The battery pack of the present invention can be configured such that the welding is ultrasonic welding.

The battery pack of the present invention has a feature of achieving sufficient strength while avoiding increase in size of the battery pack containing a cylindrical battery. This is because the battery pack of the present invention is configured as follows: the exterior case composed of the first case and the second case houses the cylindrical battery and the circuit board: the first case includes the curved portion curved along the outer peripheral surface of the cylindrical battery and the first vertical wall that is integrally connected to the end edge of the curved portion; the first vertical wall includes the fitting protrusion; the second case includes the second vertical wall that is connected to the first vertical wall; the second vertical wall includes the fitting groove; the fitting protrusion is guided to the fitting groove to weld the first vertical wall and the second vertical wall; and the first vertical wall has the inner surface in a concave shape along the inner surface of the cylindrical battery, and the leading end portion that is thicker than the curved portion. The first vertical wall having the leading end portion thicker than the curved portion allows the curved portion to be reduced in thickness while allowing the fitting protrusion provided on the opposed surface to be increased in thickness. This causes a feature of allowing the exterior case to be reduced in thickness while guiding the fitting protrusion into the fitting groove and firmly welding the first case to the second case.

DESCRIPTION OF EMBODIMENT

Figure 1:
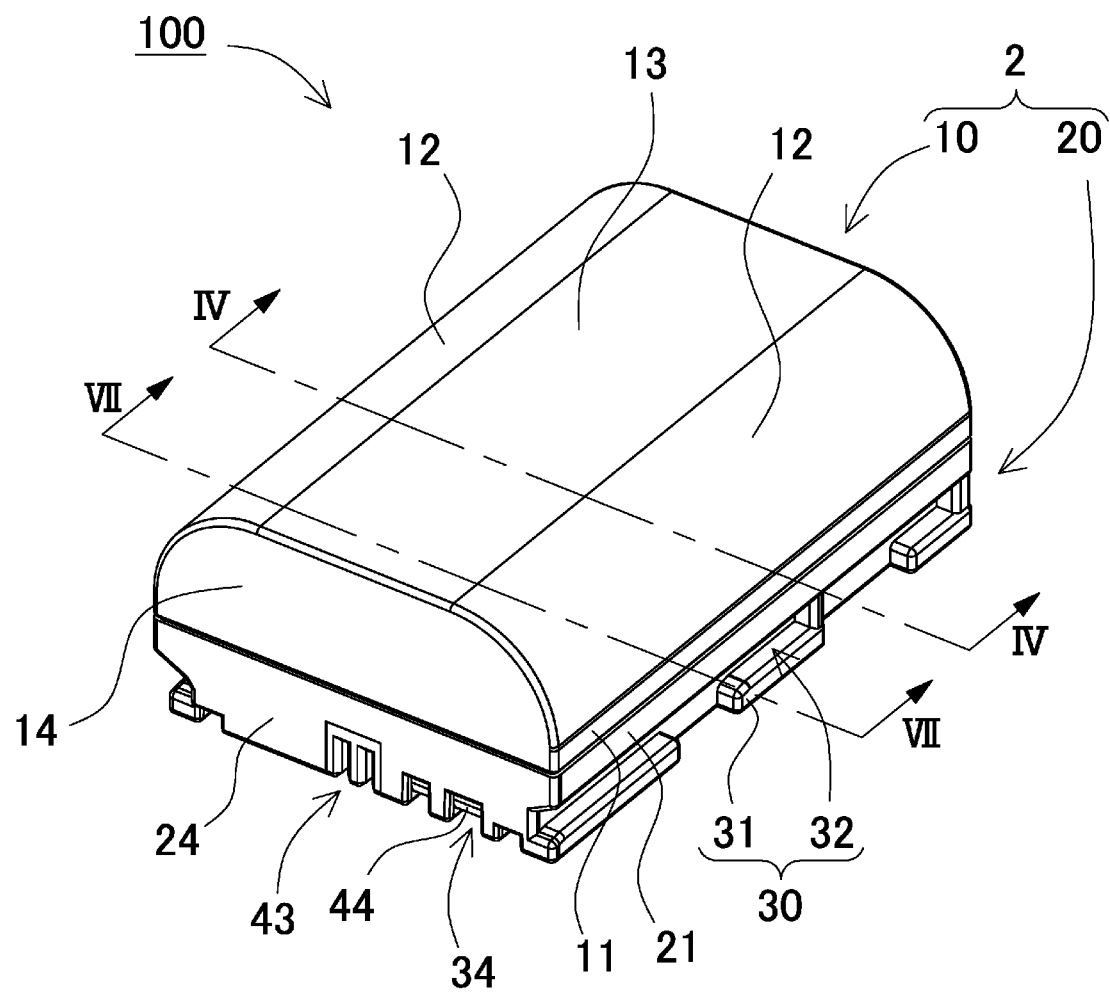
FIG. 1 is a perspective view of a battery pack according to an exemplary embodiment of the present invention.

Hereinafter, the present invention will be described in detail with reference to the drawings. Although in the following description, terms indicating a specific direction or position (e.g., "top", "bottom", and other terms including those terms) are used as necessary, those terms are used to facilitate understanding of the invention with reference to the drawings, and thus meanings of the terms do not limit the technical scope of the invention. Portions having the same reference numerals appearing in a plurality of drawings indicate the same or equivalent portions or members.

An exemplary embodiment described below is a specific example of the technical idea of the present invention, and thus does not limit the present invention. Dimensions, materials, shapes, relative placement, and the like of components described below are not intended to limit the scope of the present invention to only those, and are merely intended to show explanatory examples unless otherwise specified. Contents described in one exemplary embodiment and example can be applied to other exemplary embodiments and examples. To clarify description, sizes and a positional relationship of members illustrated in the drawings may be exaggerated.

Battery pack 100 illustrated in FIGS. 1 to 4 houses cylindrical battery 1 that is rechargeable, and circuit board 3 electrically connected to cylindrical battery 1, inside exterior case 2. Battery pack 100 illustrated in the drawings includes two cylindrical batteries 1 that are arranged parallel to each other in two rows and housed in exterior case 2. Battery pack 100 can be adjusted for charge and discharge capacity by a number of cylindrical batteries 1 housed in exterior case 2. Thus, battery pack 100 houses the number of cylindrical batteries 1 having an optimum capacity for intended use.

(Cylindrical Battery 1)

Cylindrical battery 1 is a lithium ion secondary battery. The lithium ion secondary battery has a large charge and discharge capacity by capacity and weight, so that battery pack 100 can be increased in charge and discharge capacity while being reduced in size of its outer shape and in weight. The battery pack of the present invention, however, can use all other rechargeable batteries instead of the lithium ion secondary battery.

(Exterior Case 2)

Exterior case 2 is composed of first case 10 and second case 20 that are separately molded with plastic of thermoplastic resin. Exterior case 2 illustrated in the drawings has a structure in which first case 10 and second case 20 are each in a bottomed box shape, and have opening edges facing each other that are connected to each other to house cylindrical battery 1 and circuit board 3 inside. First case 10 and second case 20 are fixed to each other by ultrasonically welding their opening edges facing each other. 30

(First Case 10)

First case 10 includes curved portion 12 that curves along an outer peripheral surface of cylindrical battery 1, planar portion 13 that is connected on both sides to respective curved portions 12 paired, first vertical walls 11 that are connected to end edges of respective curved portions 12, and end face portions 14 each having an outer edge that is perpendicularly connected to curved portion 12, planar portion 13, and first vertical wall 11, and is integrally molded wholly with thermoplastic resin. First case 10 of FIG. 4 includes fitting protrusion 15 that protrudes from opposed surface 11a of first vertical wall 11 and that is also integrally molded.

Figure 3:
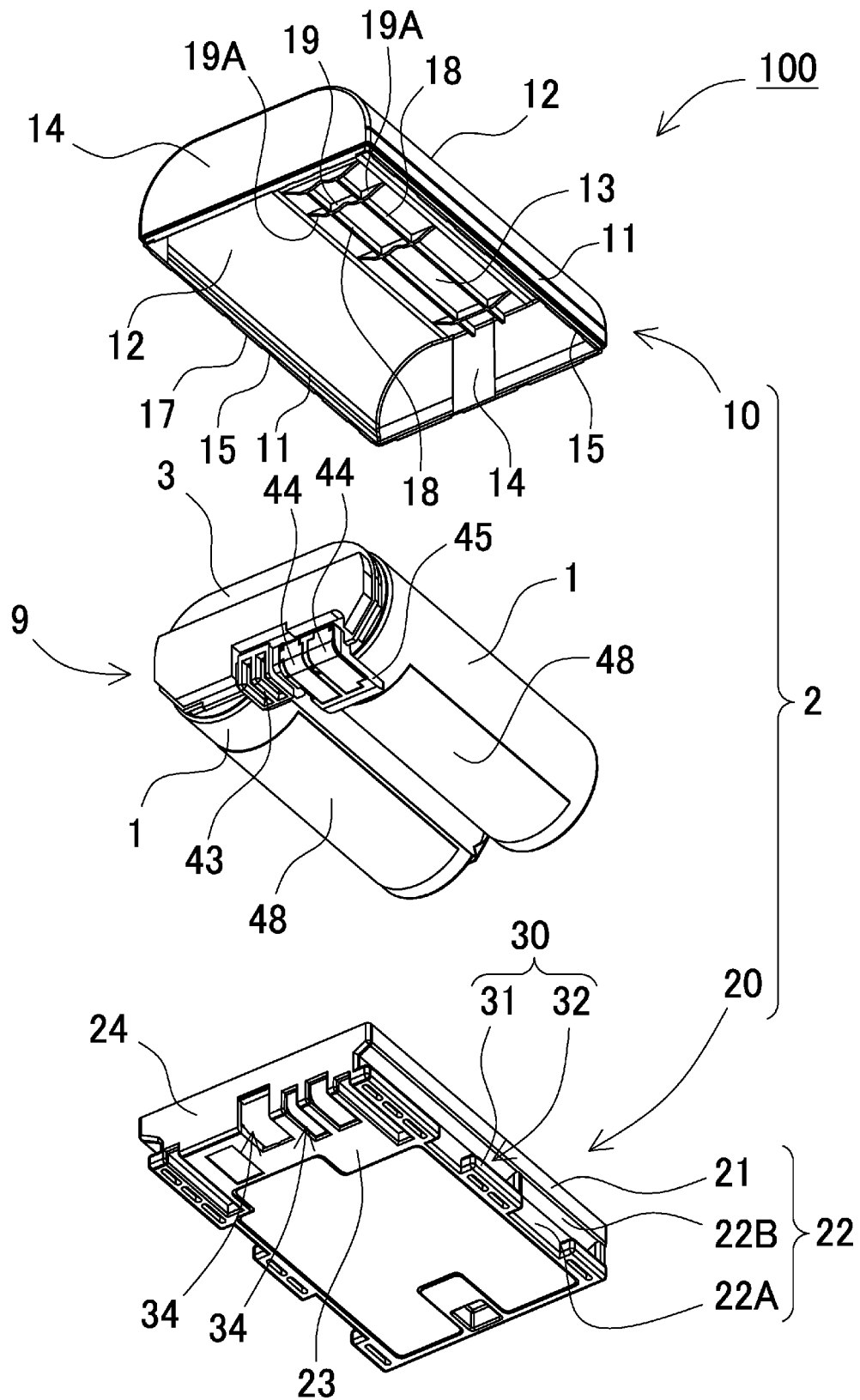
FIG. 3 is an exploded perspective view of the battery pack illustrated in FIG. 2 as viewed from below.
Figure 4:
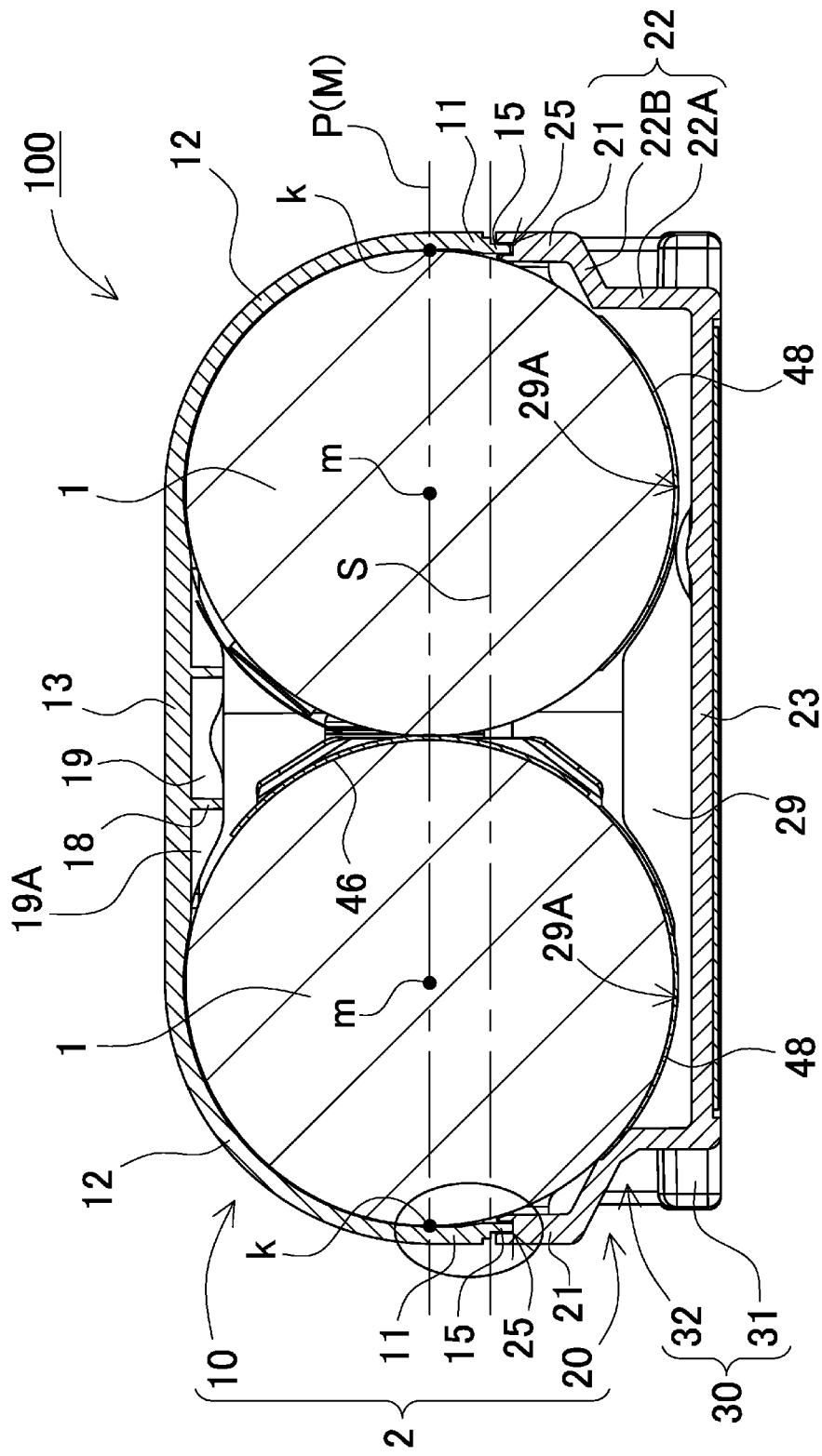
FIG. 4 is a sectional view taken along line IV-IV of the battery pack illustrated in FIG. 1.

Exterior case 2 of FIG. 4 contains two cylindrical batteries 1, so that cylindrical batteries 1 arranged on both sides each have a surface, ¼ of which is covered with curved portion 12. This curved portion 12 is molded into a shape along an outer shape of cylindrical battery 1 and houses cylindrical battery 1 in close contact with the inside of curved portion 12. Planar portion 13 is tangentially connected to an end edge of each of curved portions 12 connected to both sides of planar portion 13. As illustrated in FIGS. 3 and 4, planar portion 13 includes a plurality of rows of longitudinal ribs 18 that is integrally formed protruding inward. Longitudinal ribs 18 are disposed in a valley between two cylindrical batteries 1. Planar portion 13 further includes a plurality of rows of lateral ribs 19 that is integrally molded intersecting the plurality of rows of longitudinal ribs 18. Lateral ribs 19 are each provided at both ends with wedge portions 19A inclined downward toward both the ends. Wedge portions 19A are each formed into a shape along an outer circumference of cylindrical battery 1 to cause cylindrical battery 1 to be disposed at a fixed position.

(First Vertical Wall 11)

First vertical wall 11 is provided connected to an end edge of each of curved portions 12 connected to both sides of planar portion 13, and is disposed in a vertical attitude on each side of first case 10. Fitting protrusion 15 is provided protruding from opposed surface 11a of first vertical wall 11, and is ultrasonically welded to second case 20. First case 10 illustrated in FIG. 4 has a shape for covering ¼ of an outer circumference of a cylindrical battery with curved portion 12, in which boundary surface P including boundary position k between each of a pair of first vertical walls 11 and corresponding one of a pair of curved portions 12, which are disposed on both sides of first case 10, is disposed in central plane M extending radially and passing through center axis m of cylindrical battery 1. This first vertical wall 11 of first case 10 is disposed at a position protruding from central plane M toward second case 20.

Figure 5:
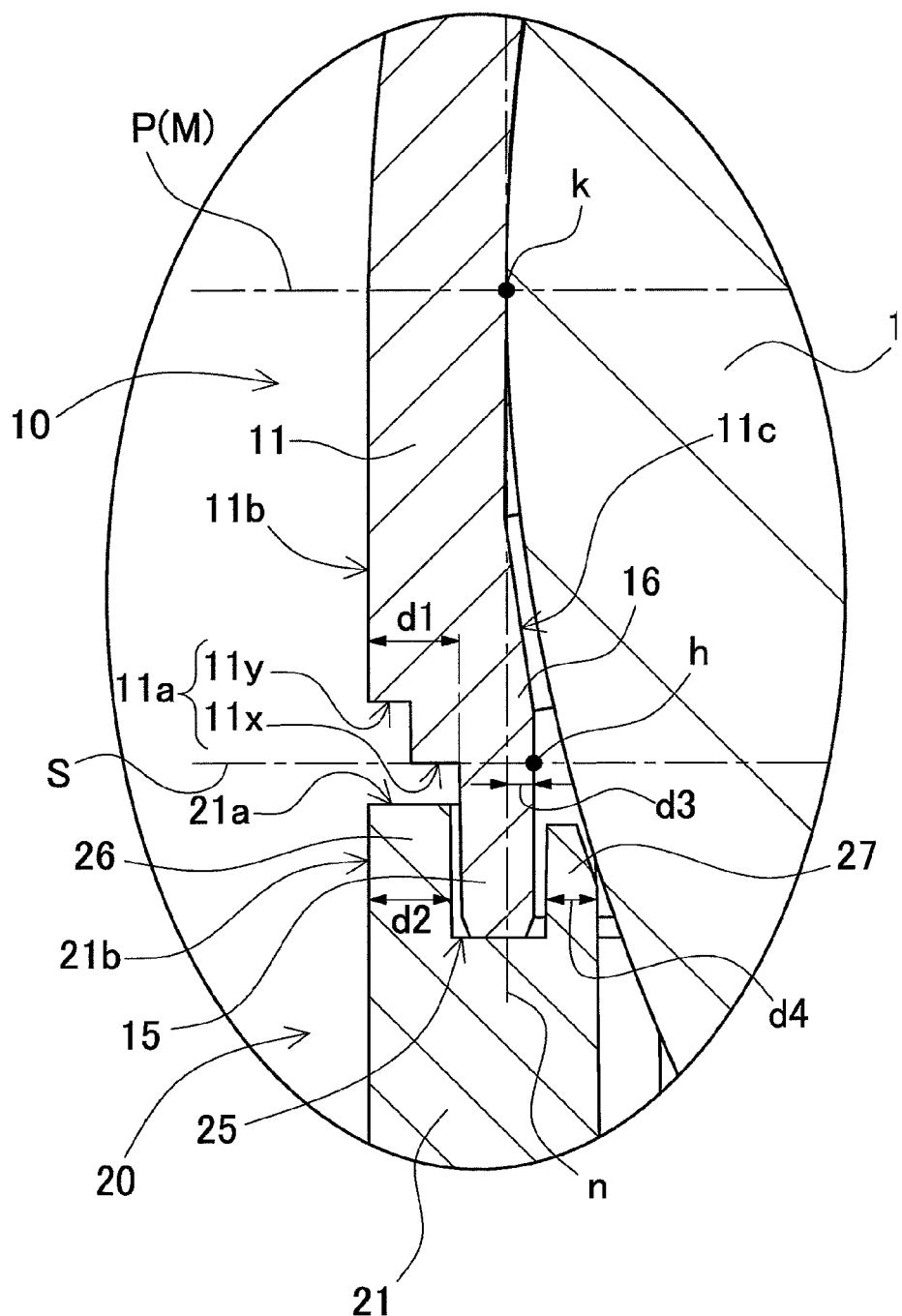
FIG. 5 is an enlarged sectional view of a main part of the battery pack illustrated in FIG. 4.

FIG. 5 is an enlarged sectional view of first vertical wall 11 in a portion provided with fitting protrusion 15. First vertical wall 11 illustrated in this drawing has inner surface 11c in a shape along the outer peripheral surface of cylindrical battery 1, and a leading end portion thicker than curved portion 12. First vertical wall 11 illustrated in FIG. 5 has outer surface 11b formed into a vertical plane and inner surface 11c formed into a concave shape along a surface of cylindrical battery 1. First vertical wall 11 in this shape gradually increases in thickness toward opposed surface 11a, so that a leading end portion with opposed surface 11a can be made thicker than curved portion 12.

First case 10 in the drawing is configured such that first vertical walls 11 are each disposed at a position protruding from central plane M toward second case 20 to allow leading end surface S including opposed surface 11a of each of first vertical walls 11 paired, disposed both sides of first case 10, to be disposed outward or toward second case 20 away from central plane M including center axis m of cylindrical battery 1. As described above, the structure in which leading end surface S including opposed surface 11a of each first vertical wall 11 is disposed away from central plane M enables the leading end portion of first vertical wall 11 to be molded thicker than curved portion 12 by providing undercut portion 16 in a concave surface shape along the surface of cylindrical battery 1 in inner surface 11c of first vertical wall 11 to bring inner surface 11c of each first vertical wall 11 close to the surface of the battery. This is because when opposed surface 11a is positioned away from boundary position k, a distance from outer surface 11b equal in height to opposed surface 11a to the surface of cylindrical battery 1 can be increased.

Fitting protrusion 15 can be disposed inside opposed surface 11a in a thick portion. In particular, the leading end portion including opposed surface 11a can be made thicker without protruding outward to allow outer surface 11b to be a vertical plane. First vertical wall 11 that enables thickening opposed surface 11a can sufficiently secure a dimension from outer surface 11b, or step dimension (d1) between an outer surface of fitting protrusion 15 and outer surface 11b of first vertical wall 11, by displacing fitting protrusion 15 inward. Step dimension (d1) affects a connection state of first case 10 and second case 20 that are connected by ultrasonic welding. As step dimension (d1) decreases, thickness (d2) of outer wall 26 outside fitting groove 25 of second vertical wall 21 decreases. This is because fitting protrusion 15 is guided into fitting groove 25 to allow first vertical wall 11 and second vertical wall 21 to have outer surfaces 11b and 21b, respectively, disposed in the same plane. When thickness (d2) of outer wall 26 outside fitting groove 25 of second vertical wall 21 decreases, connection strength of the ultrasonic welding decreases. Then, first vertical wall 11 and second vertical wall 21 cannot be ultrasonically welded at a fixed position accurately.

Although thickening the first vertical wall enables increase in thickness (d2) of an outer wall, this structure has an adverse effect of increase in size of an exterior case. Exterior case 2 of FIG. 5 includes fitting protrusion 15 disposed inside with a thickened portion including opposed surface 11a provided with fitting protrusion 15 while first vertical wall 11 is thinned. This structure secures thickness (d2) of outer wall 26 of second vertical wall 21 without thickening first vertical wall 11 outward to achieve sufficient connection strength, and also enables preventing first case 10 and second case 20 from being displaced from each other.

First vertical wall 11 has outer surface 11b formed as a vertical plane and inner surface 11c provided with undercut portion 16. Undercut portion 16 has a surface in a concave shape along the surface of cylindrical battery 1 to cause the leading end portion including opposed surface 11a to be thicker than curved portion 12. As illustrated in FIG. 5, first vertical wall 11 is formed being thicker than curved portion 12 by allowing boundary position h between inner surface 11c and fitting protrusion 15 of vertical wall 11 to be located inside tangential line n of cylindrical battery 1 at boundary position k between curved portion 12 and first vertical wall 11 using undercut portion 16 formed having a surface in a concave shape. Here, increased dimension (d3) causing the portion including opposed surface 11a to be thicker than curved portion 12, in other words, a distance (corresponding to a height of undercut portion 16) between tangent line n of cylindrical battery 1 at boundary position k between first vertical wall 11 and curved portion 12, and boundary position h between inner surface 11c of first vertical wall 11 and fitting protrusion 15, is more than or equal to 0.1 mm, for example, and is preferably more than or equal to 0.2 mm. Although increase in increased dimension (d3) enables increase in connection strength between first case 10 and second case 20, excessive increased dimension (d3) causes difficulty in smooth insertion of cylindrical battery 1 into first case 10. Thus, increased dimension (d3) is set to 1 mm or less, for example, and is preferably set to 0.5 mm or less. Increased dimension (d3) can be increased by increasing a difference between upper and lower widths of first vertical wall 11, so that increased dimension (d3) is adjusted by changing the upper and lower widths of first vertical wall 11.

Opposed surface 11a of first vertical wall 11 illustrated in FIG. 5 is divided into first opposed surface 11x and second opposed surface 11y by providing a stepped portion outside fitting protrusion 15. First opposed surface 11x constitutes leading end surface S, and is connected to fitting protrusion 15. Second opposed surface 11y is a stepped surface formed one step lower than first opposed surface 11x, and forms a gap between first vertical wall 11 and second vertical wall 21 with fitting protrusion 15 inserted into fitting groove 25 to be ultrasonically welded as illustrated in the drawing. This gap functions to comfortably mount the battery pack to a device such as an electronic device by absorbing tolerances of a battery mounting portion of the electronic device and exterior case 2 when the battery pack is mounted.

Figure 6:
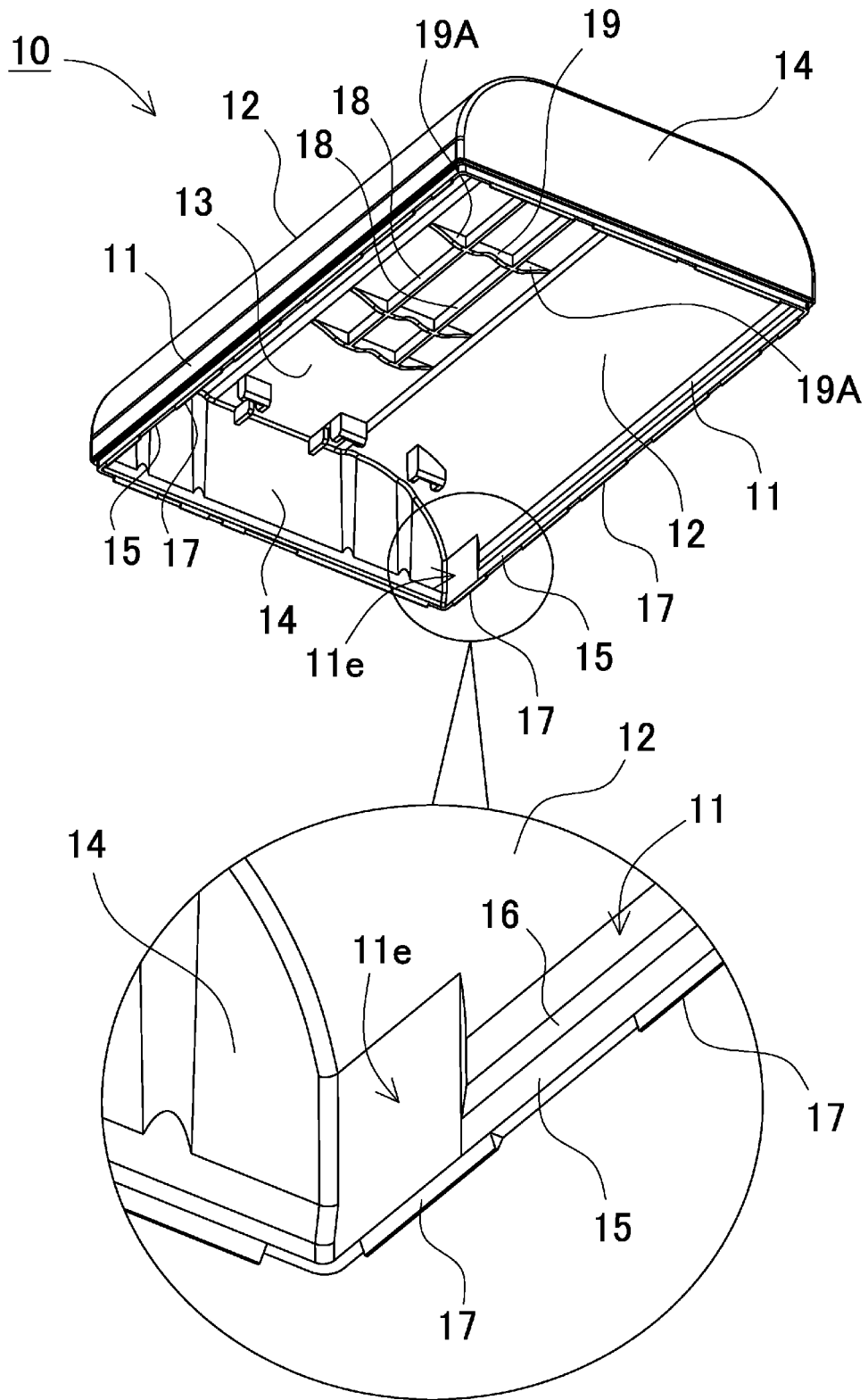
FIG. 6 is a partially enlarged bottom perspective view of a first case.

First case 10 illustrated in FIG. 6 is provided with melting protrusion 17, which is to be melted by ultrasonic welding, on a leading end surface of fitting protrusion 15 molded protruding from opposed surface 11a of first vertical wall 11. Melting protrusion 17 illustrated in the drawing is a protruding strip having a triangular sectional shape that gradually narrows toward its tip, and is provided divided into a plurality of protrusions along its 10) longitudinal direction. Fitting protrusion 15 provided on the leading end surface with melting protrusion 17 is effectively melted to enable fitting protrusion 15 to be ultrasonically welded to fitting groove 25 using vibration of an ultrasonic horn pressed against exterior case 2 while being inserted into fitting groove 25. In particular, when melting protrusion 17 is divided into the plurality of protrusions along the leading end surface of fitting protrusion 15 as illustrated in the drawing, the melting protrusion can be efficiently melted and quickly welded.

Figure 7:
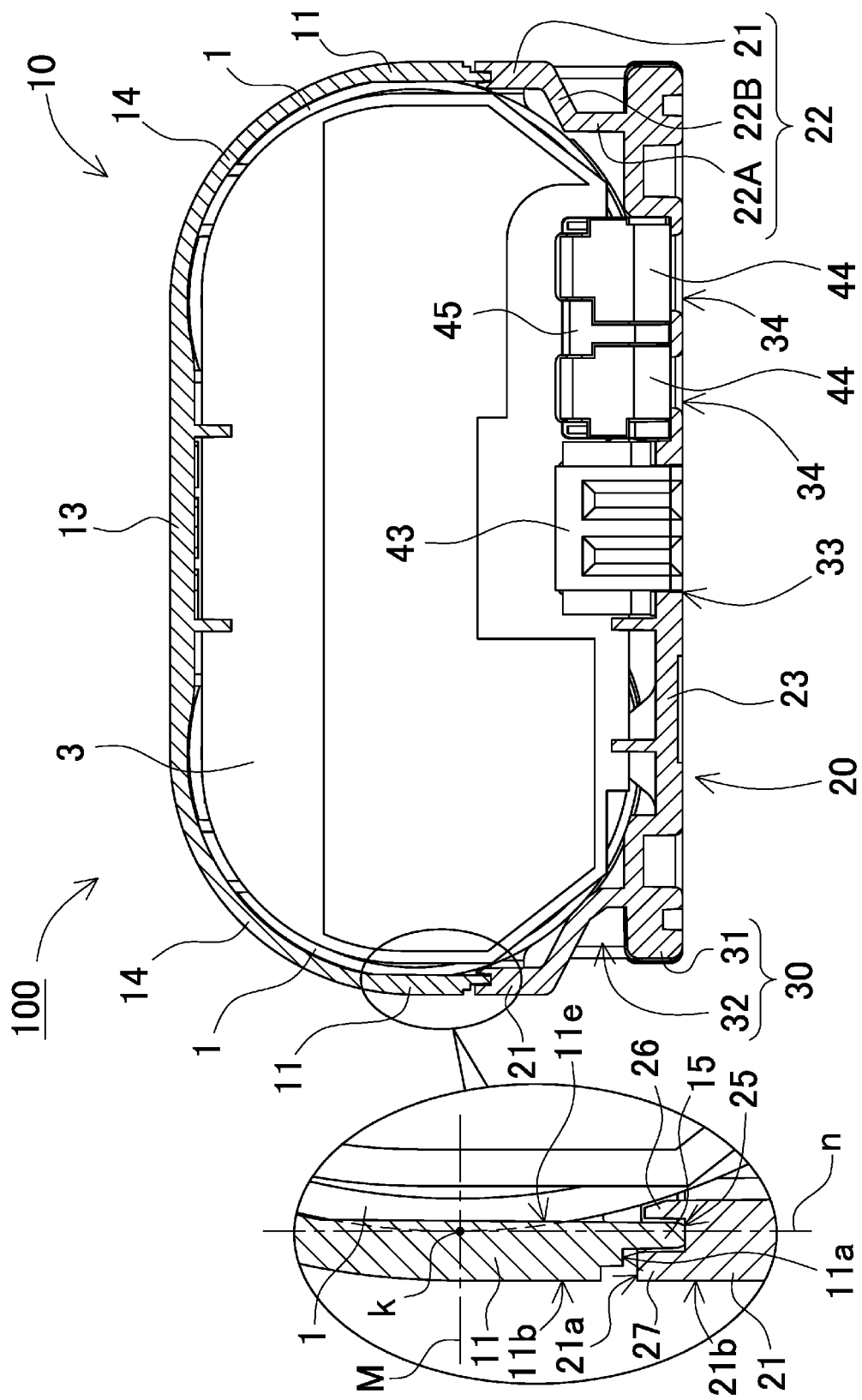
FIG. 7 is a sectional view taken along line VII-VII of the battery pack illustrated in FIG. 1.

As illustrated in FIG. 7, first case 10 of FIG. 6 is configured such that the inner surface of first vertical wall 11 is wholly disposed inside tangential line n of cylindrical battery 1 at boundary position k in a region facing a housing position of circuit board 3 disposed facing an end face of cylindrical battery 1 by forming inner surface 11c of first vertical wall 11 into a concave shape without increase in thickness. In particular, first vertical wall 11 illustrated in FIG. 7 is provided with planar portion 11e with an inner surface in a planar shape. First case 10 in this structure can be increased in strength by thickening curved portion 12 and first vertical wall 11 wholly with a uniform thickness instead of thinly molding curved portion 12 and first vertical wall 11 in a shape along the surface of cylindrical battery 1 in a region where circuit board 3 is disposed inside.

(Second Case 20)

Second case 20 includes bottom face portion 23 in a planar shape, side wall portions 22 connected to both sides of bottom face portion 23, and end face portions 24 connected vertically to both ends of each of bottom face portion 23 and side wall portion 22, and is integrally molded wholly with thermoplastic resin. Second case 20 of FIG. 2 includes an upper end opening in a shape along an opening edge of first case 10, and second vertical walls 21 provided on its both sides and connected to first vertical walls 11.

Figure 2:
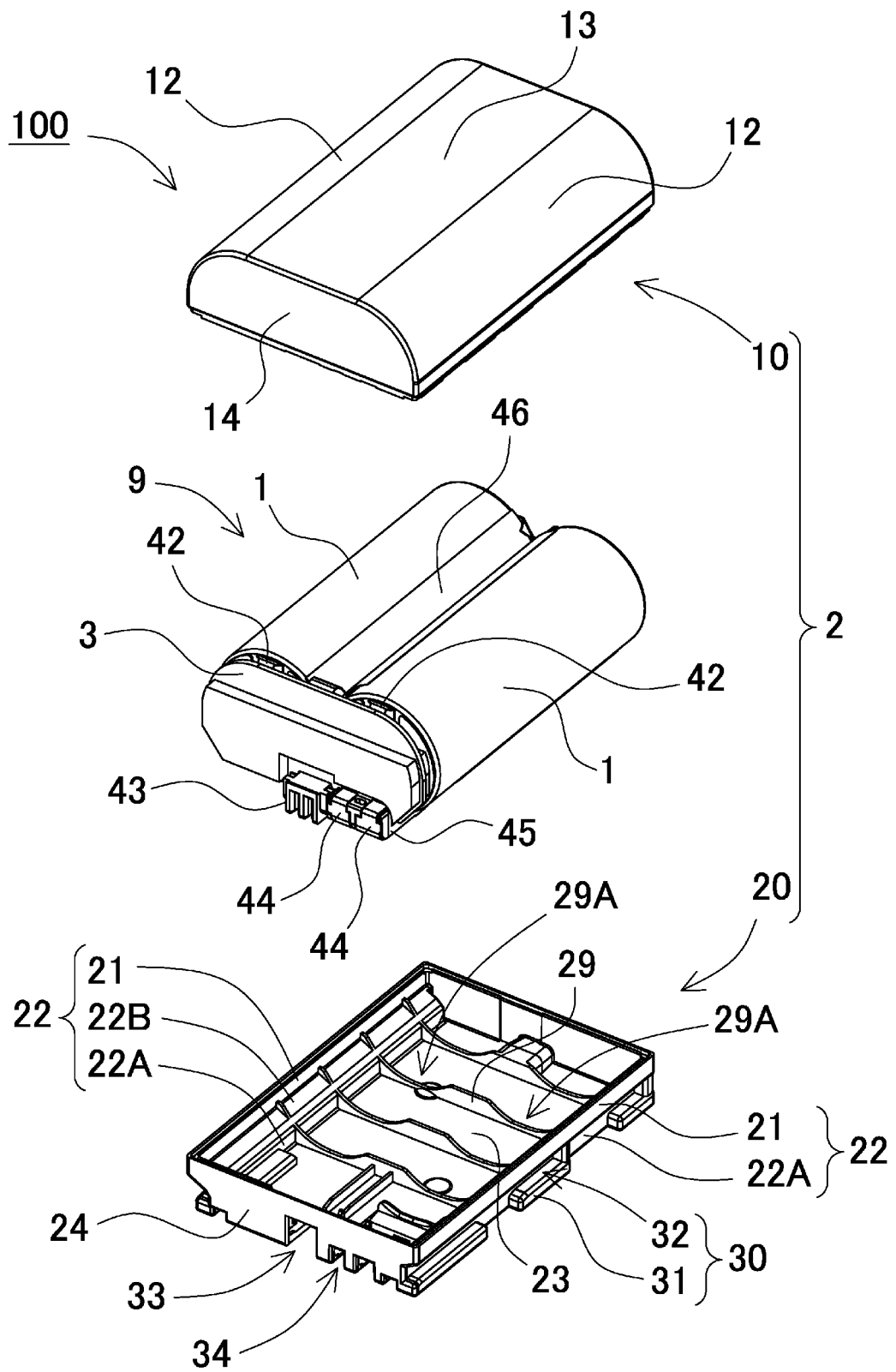
FIG. 2 is an exploded perspective view of the battery pack illustrated in FIG. 1.

Bottom face portion 23 is connected on both sides to side wall portions 22. Side wall portions 22 each have an upper portion serving as second vertical wall 21 and a lower portion serving as support portion 22A that is disposed inside second vertical wall 21. Support portion 22A is connected at its upper end to a lower end of second vertical wall 21 with bent portion 22B provided therebetween. Second case 20 is configured to support cylindrical battery 1 by bringing an intermediate portion of each of side wall portions 22, serving as a connecting portion between support portion 22A and bent portion 22B, close to cylindrical battery 1. As illustrated in FIG. 2, bottom face portion 23 further includes a plurality of rows of support ribs 29 that is integrally formed protruding inward. Support ribs 29 are each provided on both sides with curved portions 29A along the outer peripheral surface of cylindrical battery 1 to enable two cylindrical batteries 1 to be each supported at a fixed position.

(Second Vertical Wall 21)

Second vertical wall 21 is disposed in a vertical attitude on each side of second case 20. Second vertical wall 21 has opposed surface 21a facing first vertical wall 11 and being provided with fitting groove 25 for guiding fitting protrusion 15. As illustrated in FIG. 5, second vertical wall 21 includes fitting groove 25 formed in a central portion of opposed surface 21a, outer wall 26 provided outside fitting groove 25, and inner wall 27 provided inside fitting groove 25. Outer wall 26 has outer surface 21b formed into a vertical plane, and this outer surface 21b is disposed flush with outer surface 11b of first vertical wall 11. Inner wall 27 is provided at a position close to the surface of cylindrical battery 1. Second vertical wall 21 illustrated in FIG. 5 is disposed at a position farther away from central plane M including center axis m of cylindrical battery 1 than the opposed surface of first vertical wall 11 is. This causes a distance from outer surface 21b to the surface of cylindrical battery 1 to further increase, so that second vertical wall 21 is formed being thicker than first vertical wall 11. As a result, thickness (d4) of inner wall 27 disposed inside fitting groove 25 into which fitting protrusion 15 provided on first vertical wall 11 is fitted is secured to achieve sufficient connection strength by ultrasonic welding. Additionally, first vertical wall 11 and second vertical wall 21 can be ultrasonically welded accurately at a fixed position.

Second case 20 includes connector window 33 for exposing output connector 43 fixed to circuit board 3 housed in exterior case 2 to the outside, and electrode window 34 for exposing positive and negative output terminals 44 provided on terminal holder 45 fixed to circuit board 3 to the outside, the windows being provided by being opened. Second case 20 illustrated in the drawing includes connector window 33 and electrode window 34 that are each opened by cutting out a corner portion of a boundary between bottom face portion 23 and end face portion 24. Second case 20 includes connector window 33 opened at a laterally intermediate portion in one end face portion 24, and a pair of electrode windows 34 opened side by side on one side (right side in the drawing) of connector window 33. This exterior case 2 allows output connector 43 fixed to circuit board 3, which is incorporated, to be exposed to the outside through connector window 33 and positive and negative output terminals 44 to be exposed to the outside through electrode windows 34, while first case 10 is connected to second case 20.

Exterior case 2 described above includes first case 10 and second case 20 that are connected to each other by ultrasonically welding fitting protrusion 15 being provided on first vertical wall 11 and being guided into fitting groove 25 provided on second vertical wall 21. As illustrated in FIGS. 2 and 3, exterior case 2 further includes fitting protrusion 15 and fitting groove 25 that are respectively provided in opposed surfaces of end face portions 14 and 24 of first case 10 and second case 20. End face portion 14 of first case 10 and end face portion 24 of second case 20 are ultrasonically welded and connected to each other with fitting protrusion 15 guided into fitting groove 25.

Exterior case 2 described above is configured such that first case 10 includes undercut portion 16 provided in inner surface 11c of first vertical wall 11 that allows boundary position h between inner surface 11c of first vertical wall 11 and fitting protrusion 15 to be positioned inside tangential line n of cylindrical battery 1 at boundary position k between curved portion 12 and first vertical wall 11. This undercut portion 16 has a surface in a concave shape along the surface of cylindrical battery 1. Thus, when cylindrical battery 1 is guided to the fixed position in first case 10, cylindrical battery 1 is fitted while being fitted inside undercut portion 16 provided in first vertical wall 11 on each side. This enables cylindrical battery 1 to be temporarily fixed at the fixed position in first case 10. This exterior case 2 allows cylindrical battery 1 to be guided to the inside in a concave shape of first vertical wall 11 and disposed at the fixed position in first case 10 at the time of ultrasonic welding. This enables first case 10 and second case 20 to be ultrasonically welded by pressing ultrasound horn against exterior case 2 while first case 10 and second case 20 are connected at the fixed position by preventing positional displacement.

(Mounting Guide 30)

Exterior case 2 further includes mounting guide 30 to enable battery pack 100 to be attached or detached to or from a mounting portion of an electronic device while battery pack 100 is slid in a correct attitude when battery pack 100 is connected to the electronic device. Exterior case 2 illustrated in FIGS. 1 to 4 includes a plurality of mounting guides 30 that guide mounting protrusions (not illustrated) provided on the mounting portion of the electronic device, and that are provided along respective side wall portions 22 on both sides of second case 20. Second case 20 illustrated in the drawing includes guide ridge 31 protruding from a surface of support portion 22A along a lower end of side wall portion 22, and guide groove 32 provided between guide ridge 31 and second vertical wall 21, which constitute mounting guide 30. Battery pack 100 is set at a fixed position of the electronic device by guiding each mounting protrusion (not illustrated) provided in the mounting portion of the electronic device to guide groove 32.

(Circuit Board 3)

Circuit board 3 is disposed at a position facing an end face of a cylindrical battery. Circuit board 3 is mounted with an electronic component (not illustrated) that constitutes a battery charge and discharge circuit. The charge and discharge circuit charges or discharges a battery while controlling charge or discharge current to maintain battery voltage, remaining capacity, and temperature within preset ranges. As illustrated in FIGS. 2, 3 and 7, 15 circuit board 3 includes terminal holder 45 provided with positive and negative output terminals 44, output connector 43 provided with a plurality of signal terminals (not illustrated), which are fixed to circuit board 3.

(Battery Block 9)

Battery pack 100 includes exterior case 2 housing battery block 9 in which two cylindrical batteries 1 and circuit board 3 are integrally connected. As illustrated in the exploded perspective view of FIG. 8, battery block 9 includes two cylindrical batteries 1 arranged parallel to each other, and circuit board 3 connected at a position facing end faces of the cylindrical batteries. Battery block 9 is configured such that two cylindrical batteries 1 are each arranged in an opposite direction, and have one end face electrodes connected to each other with lead plate 41, and the other end face electrodes connected to circuit board 3 with respective lead plates 42. This causes two cylindrical batteries 1 to be connected in series and connected to circuit board 3. Insulating sheet 46 is disposed between two cylindrical batteries 1 to insulate them from each other. Insulating sheet 47 is also disposed between the other end face electrodes of cylindrical batteries 1 and circuit board 3 to insulate them from each other. Battery block 9 is disposed inside exterior case 2 to allow output connector 43 and output terminals 44 of terminal holder 45, which are fixed to circuit board 33, to be exposed to the outside through connector window 33 and electrode windows 34, respectively.

Battery pack 100 of the present invention is assembled through the following steps.

Figure 8:
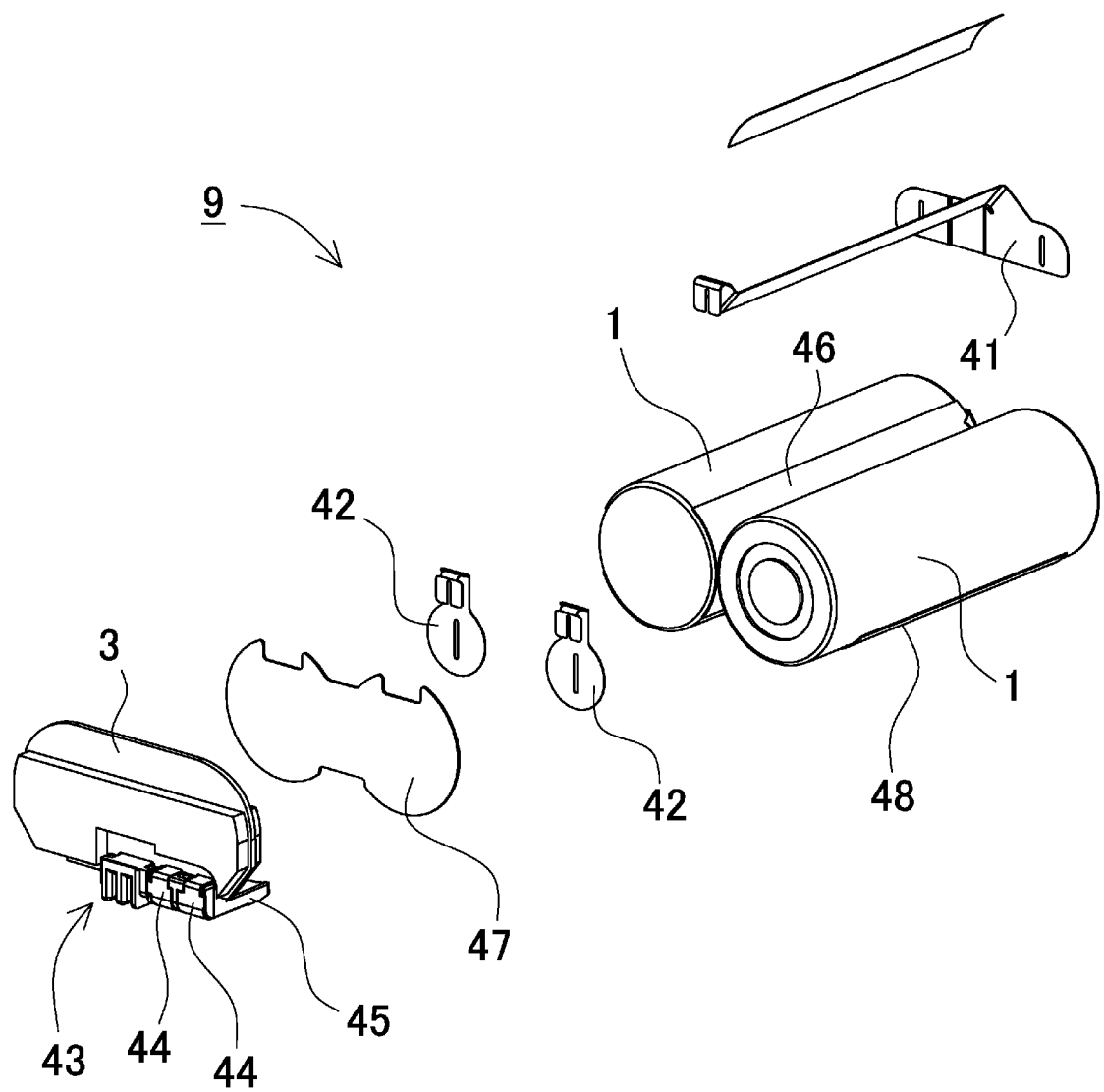
FIG. 8 is an exploded perspective view of a battery block.
Figure 9:
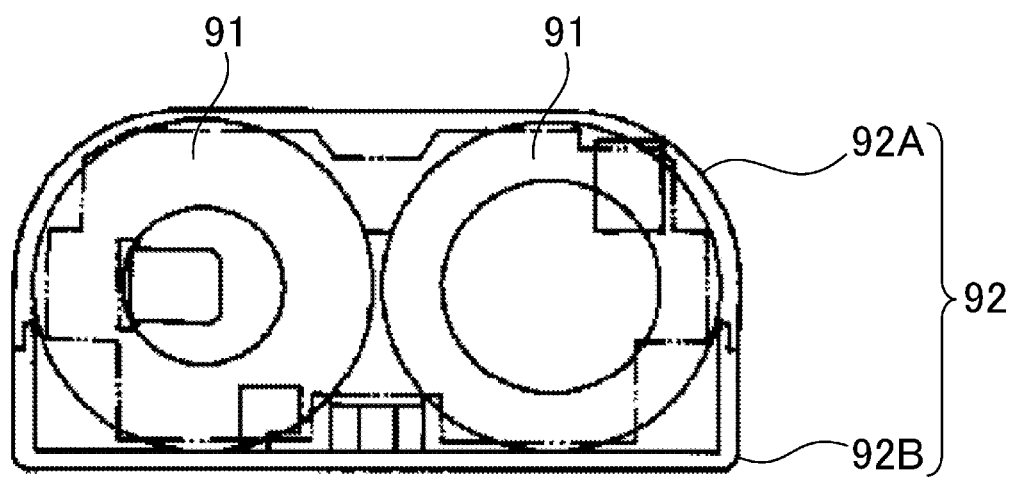
FIG. 9 is a sectional view of a conventional battery pack.

(1) As illustrated in FIG. 8, two cylindrical batteries 1 are arranged parallel to each other in opposite directions, and have one end face electrodes connected to each other with lead plate 41, and the other end face electrodes connected to circuit board 3 with respective lead plates 42, thereby forming battery block 9. Circuit board 3 is preliminarily mounted with an electronic component (not illustrated) that constitutes a charge and discharge circuit for a battery, terminal holder 45 provided with positive and negative output terminals 44, and output connector 43 provided with signal terminals.

(2) A lower portion of battery block 9 is housed in second case 20, and battery block 9 is disposed at a fixed position in second case 20. Battery block 9 is disposed while output connector 43 fixed to circuit board 3 is positioned to be fitted into connector window 33 opened in second case 20. Two cylindrical batteries 1 are fixed to an inner surface of second case 20 with double-sided tape 48 interposed therebetween, and are each disposed at a fixed position. In this state, output terminals 44 fixed to terminal holder 45 are disposed inside electrode window 34 of second case 20.

(3) First case 10 is placed on second case 20, and an upper portion of battery block 9 is housed in first case 10. Then, fitting protrusion 15 provided on first vertical wall 11 of first case 10 is guided into fitting groove 25 provided in second vertical wall 21 of second case 20, and fitting protrusion 15 provided on end face portion 14 of first case 10 is guided into fitting groove 25 provided in end face portion 24 of second case 20, thereby connecting first case 10 to second case 20 in place.

(4) Second case 20 and first case 10 connected to each other are placed on a base (not illustrated) used for ultrasonic welding. A pressing surface of an ultrasonic horn (not illustrated) is pressed against an upper surface of first case to ultrasonically weld first case 10 to second case 20.

INDUSTRIAL APPLICABILITY

The present invention can be conveniently used as a battery pack in which two cases are welded together providing a closed housing space inside the cases to house a battery in the housing space.

REFERENCE MARKS IN THE DRAWINGS 100 battery pack
1 cylindrical battery
2 exterior case
3 circuit board
9 battery block
10 first case
11 first vertical wall
11a opposed surface
11x first opposed surface
11y second opposed surface
11b vertical plane
11c inner surface
11e planar portion
12 curved portion
13 planar portion
14 end face portion
15 fitting protrusion
16 undercut portion
17 melting protrusion
18 longitudinal rib
19 lateral rib
19A wedge portion
20 second case
21 second vertical wall
21a opposed surface
21b outer surface
22 side wall portion
22A support portion
22B bent portion
23 bottom face portion
24 end face portion
25 fitting groove
26 outer wall
27 inner wall
29 support rib
29A curved portion
30 mounting guide
31 guide ridge
32 guide groove
33 connector window
34 electrode window 41 lead plate
42 lead plate
43 output connector
44 output terminal
45 terminal holder
46 insulating sheet
47 insulating sheet
48 double-sided tape
91 cylindrical battery
92 exterior case
92A first case
92B second case
h boundary position
k boundary position
m center axis
n tangential line
M central plane
P boundary surface
S leading end surface

The invention claimed is:

1. A battery pack comprising:
a cylindrical battery;
a circuit board that is electrically connected to the cylindrical battery and is mounted with a charge and discharge circuit; and
an exterior case including a first case and a second case, the exterior case housing the cylindrical battery and the circuit board,
the first case including:
a curved portion that curves along an outer peripheral surface of the cylindrical battery; and
a first vertical wall that is integrally connected to an end edge of the curved portion,
the second case including
a second vertical wall connected to the first vertical wall,
the first vertical wall having a fitting protrusion protruding from a first opposed surface of the first vertical wall facing the second vertical wall,
the second vertical wall having a fitting groove, the fitting groove being disposed in a second opposed surface of the second vertical wall facing the first vertical wall and guiding the fitting protrusion,
the first vertical wall and the second vertical wall being welded together with the fitting protrusion being guided into the fitting groove, and
the first vertical wall having an inner surface in a concave shape along a surface of the cylindrical battery, wherein a leading end portion of the first vertical wall defining the first opposed surface of the first vertical wall is thicker than the curved portion,
wherein a pair of the first vertical walls is provided on opposite sides of the first case, such that the pair of the first vertical walls faces each other with the cylindrical battery interposed therebetween when viewed in an axial direction of the cylindrical battery,
a first boundary position is defined where the inner surface of each of the pair of the first vertical walls meets a corresponding end edge of the curved portion,
a boundary plane including the first boundary positions of the pair of the first vertical walls coincides with a central plane extending radially and passing through a center axis of the cylindrical battery, and
the pair of the first vertical walls protrudes from the central plane toward the second case when viewed in the axial direction.

2. The battery pack according to claim 1, wherein
a second boundary position is defined where the inner surface of one of the first vertical walls meets a proximal end of the fitting protrusion, and
when viewed in an axial direction of the cylindrical battery, the second boundary position is located inward toward the cylindrical battery from a tangential line of the cylindrical battery drawn at a point where the outer peripheral surface of the cylindrical battery is closest to the first boundary position of the one of the first vertical walls.

3. The battery pack according to claim 2, wherein a distance between the tangential line of the cylindrical battery and the second boundary position is more than or equal to 0.1 mm and less than or equal to 1 mm.

4. The battery pack according to claim 1, wherein a leading end surface including the first opposed surface of each of the pair of the first vertical walls is disposed outward toward the second case away from the central plane.

5. The battery pack according to claim 1, wherein the circuit board is disposed at a position opposite an end face of the cylindrical battery in the axial direction of the cylindrical battery.

6. The battery pack according to claim 5, wherein
the inner surface of one of the pair of the first vertical walls has a region thereof configured to be adjacent to the circuit board,
when viewed in the axial direction, the region of the inner surface is wholly disposed inward toward the circuit board from a tangential line of the cylindrical battery drawn at a point where the outer peripheral surface of the cylindrical battery is closest to the first boundary position of the one of the pair of the first vertical walls.

7. The battery pack according to claim 5, wherein
the inner surface of one of the pair of the first vertical walls has a region thereof configured to be adjacent to the circuit board, and
the region of the inner surface is in a planar shape.

8. The battery pack according to claim 1, wherein the welding is ultrasonic welding.

* * * * *